(12) United States Patent
Husband et al.

(10) Patent No.: US 10,895,170 B2
(45) Date of Patent: Jan. 19, 2021

(54) SHEAR WAVE RESISTANT FLANGE ASSEMBLY

(71) Applicant: United Technologies Corporation, Farmington, CT (US)

(72) Inventors: Jason Husband, South Glastonbury, CT (US); Canio M. Hoffarth, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 211 days.

(21) Appl. No.: 16/166,737

(22) Filed: Oct. 22, 2018

(65) Prior Publication Data
US 2020/0123932 A1  Apr. 23, 2020

(51) Int. Cl.
*F01D 25/24* (2006.01)
*F16L 23/028* (2006.01)
(Continued)

(52) U.S. Cl.
CPC ............. *F01D 25/243* (2013.01); *F02C 7/20* (2013.01); *F02K 1/80* (2013.01); *F16L 23/028* (2013.01);
(Continued)

(58) Field of Classification Search
CPC ............. F01D 25/243; F02C 7/20; F02K 1/80
See application file for complete search history.

(56) References Cited

U.S. PATENT DOCUMENTS 3,721,460 A * 3/1973 Holman et al. ............ F02K 1/80
285/148.19
4,756,638 A * 7/1988 Neyret .................... E05B 9/084
403/261
(Continued)

FOREIGN PATENT DOCUMENTS

CN     204040053     12/2014
CN     207176503      4/2018
(Continued)

OTHER PUBLICATIONS

European Search Report for European Patent Application No. 19204704.1 completed Mar. 3, 2020.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

An assembly for a gas turbine engine according to an example of the present disclosure includes, among other things, a first annular case that has a first body extending from a first end portion and a second annular case that has a second body extending along a longitudinal axis from a second end portion. The first end portion has a first flange. The first flange has at least one mounting assembly. The at least one mounting assembly has a first aperture dimensioned to receive a fastener and a first ramped surface that extends axially away from the first aperture. The second end portion includes at least one flange that defines a receptacle dimensioned to receive the first end portion and a second aperture dimensioned to receive the fastener and a second ramped surface. The first annular case is moveable in an axial direction relative to the longitudinal axis through an axial opening of the receptacle such that the first end portion is received in the receptacle, and is rotatable about the longitudinal axis to define an interface between the first and (Continued)

second ramped surfaces to interlock the first end portion in the receptacle and limit movement of the first annular case relative to the longitudinal axis. A method of assembly for a gas turbine engine is also disclosed.

19 Claims, 7 Drawing Sheets

(51) Int. Cl.
  *F16L 23/032* (2006.01)
  *G01N 29/04* (2006.01)
  *F02K 1/80* (2006.01)
  *F02C 7/20* (2006.01)
(52) U.S. Cl.
  CPC .......... *F16L 23/032* (2013.01); *G01N 29/043* (2013.01); *F05D 2260/33* (2013.01); *F05D 2260/36* (2013.01); *F16B 2200/506* (2018.08); *G01N 2291/044* (2013.01)

(56) References Cited

U.S. PATENT DOCUMENTS

| | | | | |
|---|---|---|---|---|
| 4,951,973 A | * | 8/1990 | Corsmeier | F16B 2/14 |
| | | | | 285/24 |
| 4,953,282 A | | 9/1990 | Corsmeier et al. | |
| 5,145,276 A | * | 9/1992 | Demange | F16B 7/20 |
| | | | | 285/360 |
| 5,737,913 A | * | 4/1998 | Terry | F01D 25/243 |
| | | | | 285/360 |
| 7,530,607 B2 | * | 5/2009 | Luft | F16B 7/0406 |
| | | | | 285/402 |
| 8,925,331 B2 | * | 1/2015 | Carrere | F23R 3/002 |
| | | | | 60/798 |
| 9,676,469 B2 | * | 6/2017 | Benner | B64C 1/12 |
| 2012/0011826 A1 | * | 1/2012 | Barnes | F02K 3/06 |
| | | | | 60/226.2 |
| 2012/0027508 A1 | * | 2/2012 | Juh | F16D 1/04 |
| | | | | 403/319 |
| 2012/0107107 A1 | * | 5/2012 | Chan | F01D 25/28 |
| | | | | 415/182.1 |
| 2014/0133976 A1 | * | 5/2014 | Remy | F01D 25/243 |
| | | | | 415/213.1 |
| 2016/0102692 A1 | * | 4/2016 | James | F01D 25/243 |
| | | | | 29/428 |
| 2016/0160690 A1 | * | 6/2016 | Sokhey | F02K 1/386 |
| | | | | 415/208.1 |
| 2018/0119615 A1 | * | 5/2018 | Scott | B64C 11/14 |
| 2020/0123932 A1 | * | 4/2020 | Husband | F01D 11/08 |

FOREIGN PATENT DOCUMENTS

| | | |
|---|---|---|
| EP | 3091200 | 11/2016 |
| EP | 3269947 | 1/2018 |
| GB | 632049 | 11/1949 |

* cited by examiner

SHEAR WAVE RESISTANT FLANGE ASSEMBLY

BACKGROUND

This disclosure relates to a gas turbine engine, and more particularly to mounting adjacent engine components.

A gas turbine engine can include a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Adjacent engine components may be attached together along opposing flanges. The flanges typically extend radially from the components and are attached together with fasteners.

SUMMARY

An assembly for a gas turbine engine according to an example of the present disclosure includes a first annular case that has a first body extending from a first end portion and a second annular case that has a second body extending along a longitudinal axis from a second end portion. The first end portion has a first flange. The first flange has at least one mounting assembly. The at least one mounting assembly has a first aperture dimensioned to receive a fastener and a first ramped surface that extends axially from the first aperture. The second end portion includes at least one flange that defines a receptacle dimensioned to receive the first end portion and a second aperture dimensioned to receive the fastener and a second ramped surface. The first annular case is moveable in an axial direction relative to the longitudinal axis through an axial opening of the receptacle such that the first end portion is received in the receptacle, and is rotatable about the longitudinal axis to define an interface between the first and second ramped surfaces to interlock the first end portion in the receptacle and limit movement of the first annular case relative to the longitudinal axis.

In a further embodiment of any of the foregoing embodiments, the first and second annular cases extend about the longitudinal axis to bound a gas path.

In a further embodiment of any of the foregoing embodiments, the first aperture defines an aperture axis having a major component that extends in a radial direction with respect the longitudinal axis.

In a further embodiment of any of the foregoing embodiments, the first ramped surface is a declined ramped surface that extends away from a first rim of the first aperture, the second ramped surface is an inclined ramped surface that extends toward a second rim of the second aperture, and the inclined and declined ramp surfaces each have a major component that extends in the axial direction.

In a further embodiment of any of the foregoing embodiments, the second end portion includes an annular flange that opposes the at least one flange to define a channel of the receptacle. The channel is dimensioned to receive the first end portion, and the second ramped surface defines a portion of the channel.

In a further embodiment of any of the foregoing embodiments, the first aperture defines a first height, the channel extends inwardly from the axial opening, the axial opening defines a second height, and the first height is greater than the second height.

In a further embodiment of any of the foregoing embodiments, the at least one mounting assembly includes an insert at least partially received in the first body. The insert defines the first aperture and the first ramped surface.

In a further embodiment of any of the foregoing embodiments, the first body is made of a first material, and the insert is made of a second, different material.

In a further embodiment of any of the foregoing embodiments, the at least one flange is a plurality of flanges circumferentially distributed along the second end portion relative to the longitudinal axis, the first flange is an annular flange, and the at least one mounting assembly includes a plurality of mounting assemblies circumferentially distributed along the annular flange that interlock with a respective one of the plurality of flanges to limit movement of the first annular case relative to the longitudinal axis.

In a further embodiment of any of the foregoing embodiments, the at least one mounting assembly defines a circumferentially extending ramped surface that interfaces with a circumferentially extending ramped surface of the at least one flange to limit circumferential movement of the at least one mounting assembly relative to the longitudinal axis.

A gas turbine engine according to an example of the present disclosure includes a first engine case that has a first body extending along an engine longitudinal axis from a first end portion to bound a gas path, a second engine case that has a second body extending along the engine longitudinal axis from a second end portion to bound the gas path, and a plurality of fasteners. The first end portion has a first flange that has a plurality of mounting assemblies circumferentially distributed about the engine longitudinal axis. Each of the flange assemblies have a first aperture dimensioned to receive a respective one of the fasteners and a declined ramped surface that extends away from a first rim of the first aperture. The second end portion has a plurality of flanges circumferentially distributed about the engine longitudinal axis. Each of the plurality of flanges define a receptacle dimensioned to receive the first end portion, a second aperture dimensioned to receive a respective one of the fasteners and an inclined ramped surface that extends toward a second rim of the second aperture. The first engine case is moveable in an axial direction into each receptacle and is then rotatable in a circumferential direction about the engine longitudinal axis to interlock each of the plurality of mounting assemblies and a respective one of the plurality of flanges.

In a further embodiment of any of the foregoing embodiments, one of the first and second engine cases is an inlet case that defines an inlet of a gas turbine engine, and the inlet case is cantilevered from another one of the first and second engine cases when in an installed position.

In a further embodiment of any of the foregoing embodiments, each of the mounting assemblies includes an insert at least partially received in the first body, the insert defining the first aperture and the declined ramped surface.

In a further embodiment of any of the foregoing embodiments, the first body is made of a composite material, and the insert is made of a metallic material.

In a further embodiment of any of the foregoing embodiments, the first aperture defines an aperture axis having a major component that extends in a radial direction with respect the engine longitudinal axis.

A method of assembly for a gas turbine engine according to an example of the present disclosure includes moving a first flange of a first engine case along a longitudinal axis into a receptacle of a second flange of a second engine case, rotating the first engine case about the longitudinal axis such that a first ramped surface of the first flange abuts a second ramped surface of the receptacle to interlock the first and second engine cases, and mechanically attaching the first and second flanges with a fastener received in respective apertures of the first and second flanges. The first and second ramped surfaces slope from the respective apertures.

In a further embodiment of any of the foregoing embodiments, the second engine case includes an annular flange that opposes the second flange to define a channel of the receptacle. The channel is dimensioned to receive the first flange, the second ramped surface defines a portion of the channel, and the step of mechanically attaching the first and second flanges includes pre-loading the fastener to compress the annular flange and the second flange against the first flange such that a height of the groove is reduced in a radial direction with respect to the longitudinal axis.

In a further embodiment of any of the foregoing embodiments, each of the respective apertures defines an aperture axis having a major component that extends in a radial direction with respect the longitudinal axis.

In a further embodiment of any of the foregoing embodiments, the first and second ramped surfaces slope from the respective apertures.

A further embodiment of any of the foregoing embodiments includes securing an insert in a thickness of the first flange. The insert defines the first ramped surface and a respective one of the apertures.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
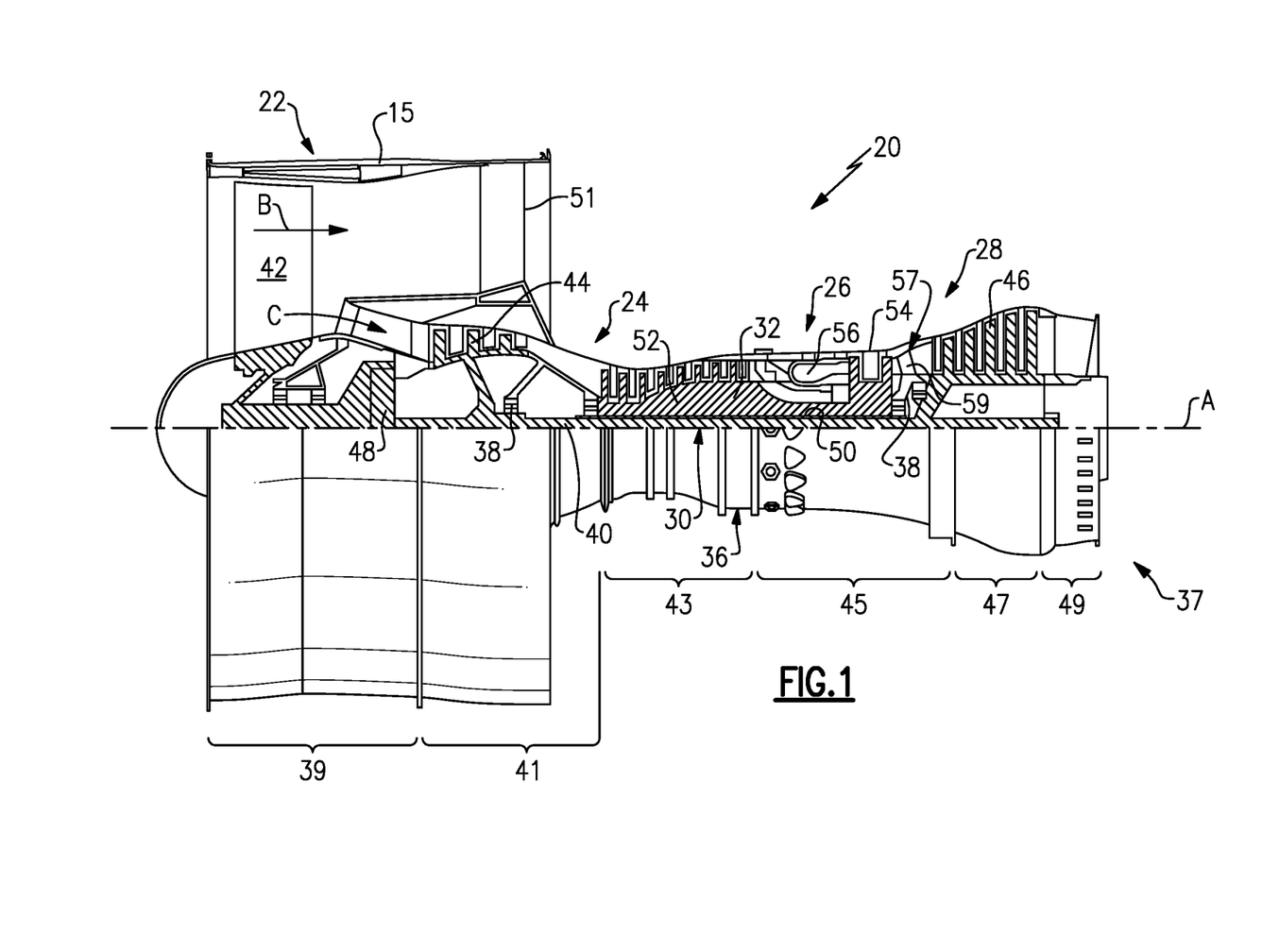
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The engine static structure 36 generally has sub-structures including a case structure 37 often referred to as the engine "backbone." In examples, the case structure 37 at least partially houses the engine sections 22, 24, 26, 28 and, where applicable, the geared architecture 48. In the illustrated example of FIG. 1, the case structure 37 includes a fan case 39, an intermediate case (IMC) 41, a high pressure compressor case 43, a thrust case 45, a low pressure turbine case 47, and a turbine exhaust case (TEC) 49. The fan blades 42 are surrounded by the fan case 39 to define a fan duct.

The cases 43, 45, 47 and 49 of the case structure 37 are secured to the fan case 39 at the IMC 41. The IMC 41 includes circumferentially spaced, radially extending struts 51 which radially span between the IMC 41 and fan case 39. It should be understood that various engines with various case and frame structures may benefit from the teachings of this disclosure.

Figure 2:
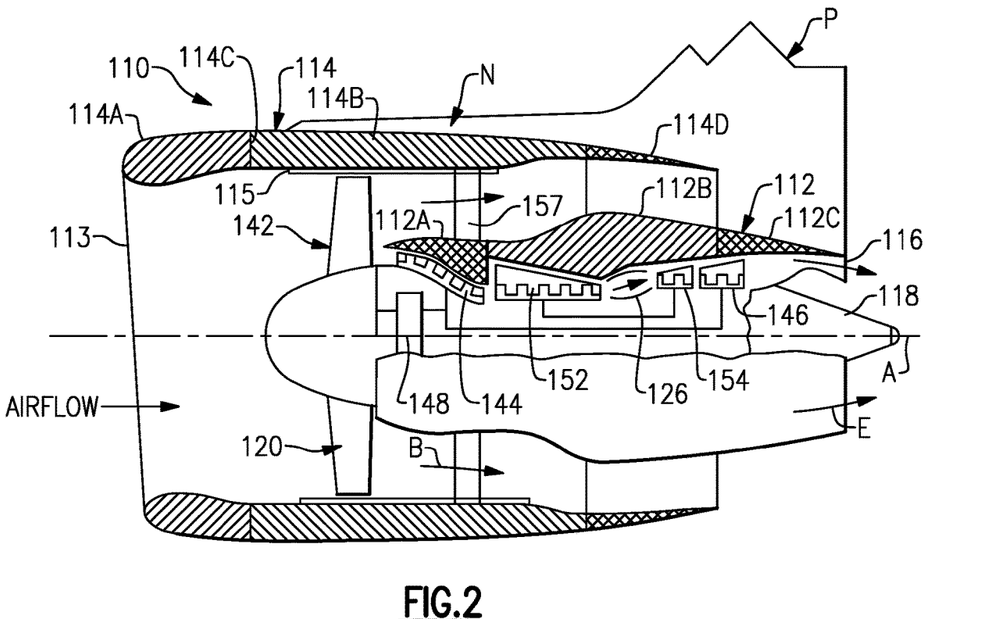
FIG. 2 is a partial fragmentary view of an exemplary gas turbine engine including a nacelle assembly.

FIG. 2 illustrates a nacelle assembly 110 for a gas turbine engine 120. In this disclosure, like reference numerals designate like elements where appropriate and reference numerals with the addition of one-hundred or multiples thereof designate modified elements that are understood to incorporate the same features and benefits of the corresponding original elements.

The gas turbine engine 120 is suspended from an engine pylon P within a nacelle assembly N. The nacelle assembly N includes a core nacelle or cowling 112 and a fan nacelle 114 which at least partially surrounds the core nacelle 112 and fan case 115. A core engine exhaust E exits the core nacelle 112 through a core nozzle 116 defined between the core nacelle 112 and a tail cone 118. The fan nacelle 114 can include an inlet case 114A that defines an engine inlet 113 and a second case 114B mechanically attached or otherwise secured to the fan case 115. The cases 114A, 114B can be mechanically attached or otherwise secured at an interface 114C such that the inlet case 114A is cantilevered from the second case 114B, with at least a majority or substantially all structural loads exerted on the inlet case 114A being transferred to the second case 114B at the interface 114C. The fan nacelle 114 can include one or more other portions, such as nozzle 114D mechanically attached or otherwise secured to the second case 114B. The core nacelle 112 can include two or more portions mechanically attached or otherwise secured to each other, including cases 112A-112C that surround at least a portion of the engine core.

Figure 3:
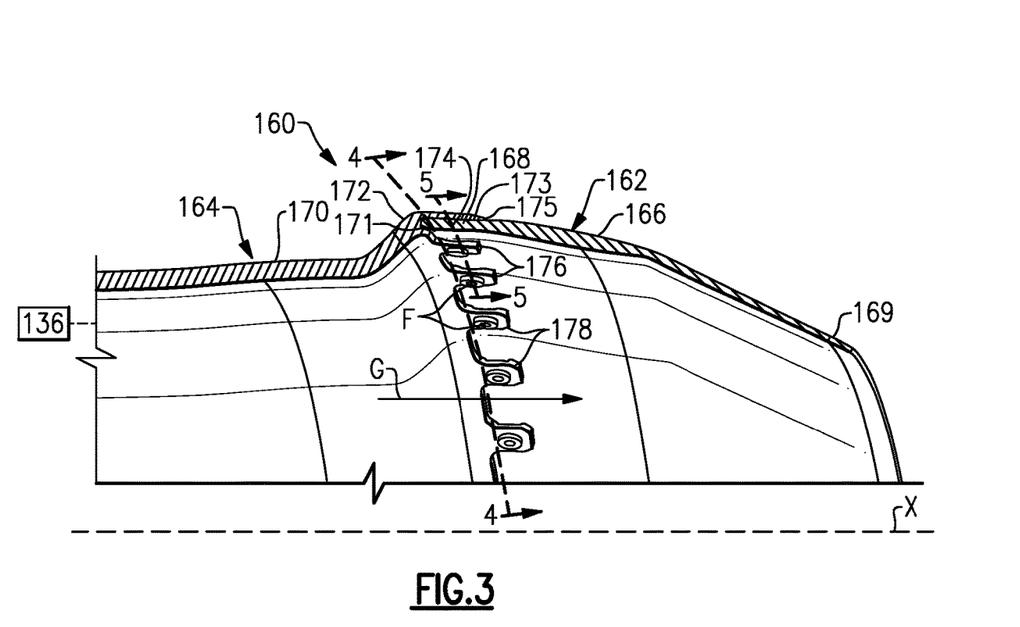
FIG. 3 illustrates a sectional view of an assembly including adjacent gas turbine engine components.
Figure 4:
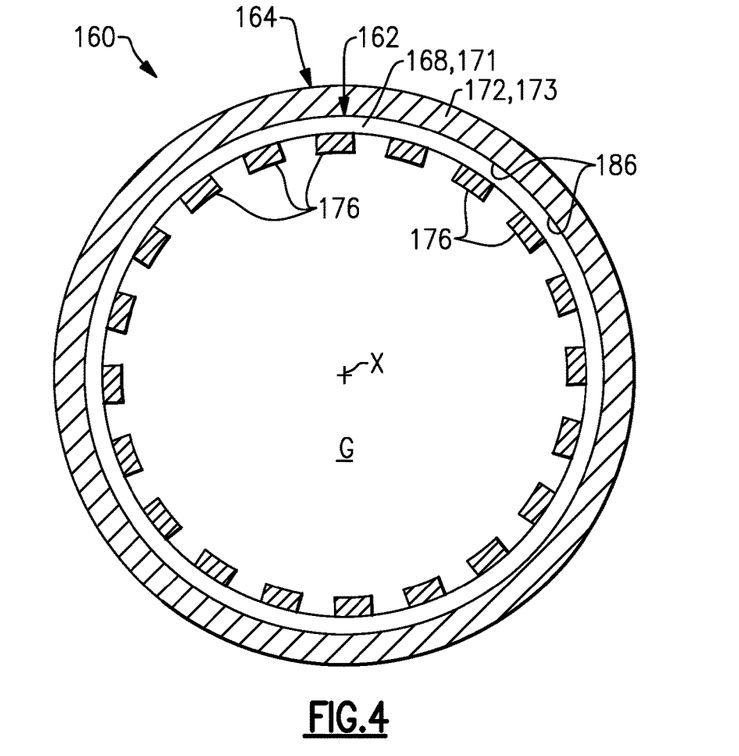
FIG. 4 illustrates a sectional view of the assembly taken along line 4-4 of FIG. 3.

FIG. 3 illustrates an assembly 160 for a gas turbine engine according to an example. The assembly 160 includes first and second gas turbine engine components, illustrated as first and second engine cases 162, 164. Other gas components can benefit from the teachings herein, such as bearing housing support structures, engine mounts and other adjacent components that are mechanically attached. Each of the cases 162, 164 can be an annular case that extends about a longitudinal axis X to bound a gas path G, as illustrated by FIG. 4. The longitudinal axis X can be parallel or collinear with the engine longitudinal axis A of FIGS. 1 and 2, for example. The assembly 160 and cases 162, 164 can be incorporated into a gas turbine engine, such as portions of the case structure 37 or mid-turbine frame 57 of engine 20 or the nacelle assembly N of FIG. 2. Other portions of the engine and other systems can benefit from the teachings disclosed herein, including land-based gas turbine engines.

One of the cases 162, 164 can be cantilevered relative to another one of the cases 162, 164 when in an installed position. For example, one of the cases 162, 164 can be an inlet case that defines an inlet of a gas turbine engine, such as the inlet case 114A of FIG. 2. One of the cases 162, 164, such as the second case 164, can be mechanically attached to a portion of an engine static structure 136 to limit movement of the second case 164 relative to the longitudinal axis X.

The first case 162 includes a first body 166 extending along the longitudinal axis X from a first end portion 168 to a second end portion 169 to bound an outer diameter of the gas path G. The first end portion 168 includes a first annular flange 174 that extends about the longitudinal axis X to define annular lip 171.

The second case 164 includes a second body 170 that extends along the longitudinal axis X from a second end portion 172. The second end portion 172 includes an annular flange 173 that extends about the longitudinal axis X to define an annular lip 175. Each of the flanges 173, 174 has a major component that extends in an axial direction and are dimensioned to axially overlap with respect to the longitudinal axis X, as illustrated in FIG. 3.

Figure 5:
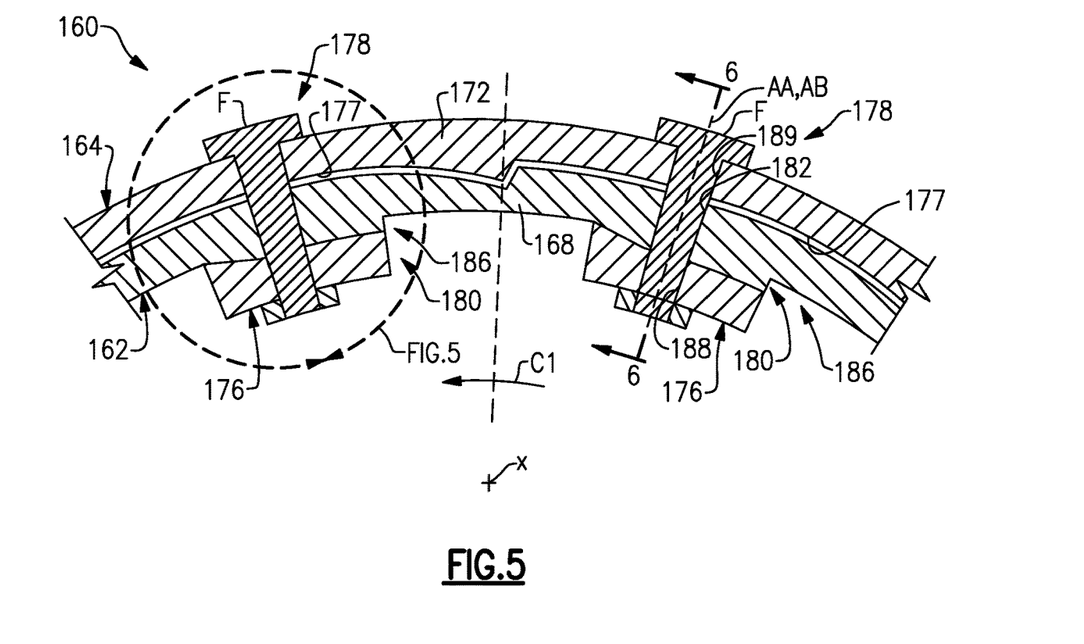
FIG. 5 illustrates a sectional view of adjacent twist lock features taken along line 5-5 of FIG. 3.

The second end portion 172 defines one or more flanges 176 that oppose the annular flange 173 of the second case 164 to define a plurality of receptacles 186 (FIG. 4). The flanges 176 can be circumferentially distributed along the second portion 172 relative to longitudinal axis X, as illustrated by FIGS. 3-5. In the illustrated example of FIGS. 3-4, flanges 176 are radially inward of annular flange 173. In other examples, flanges 176 are radially outward of annular flange 173. The flanges 173, 174, 176 are mechanically attached with a plurality of fasteners F to limit relative movement of the cases 162, 164 as discussed in more detail below. Each of the fasteners F can be a bolt that is mechanically attached to a respective nut, for example. Other exemplary fasteners can include rivets, snaps and clips.

Referring to FIG. 5-8, with continued reference to FIGS. 3-4, the assembly 160 includes one or more twist lock features 178 that are utilized to mechanically attach and interlock the cases 162, 164 when in an installed position. The twist lock features 178 incorporate at least two different directions of relative movement of the cases 162, 164, such as axial and circumferential movement relative to the longitudinal axis X, to mechanically attach the cases 162, 164 by interlocking the flanges 173, 174 and 176.

The first flange 174 includes one or more mounting assemblies 180 that interlock with surfaces of a respect one of the flanges 176 to limit movement of the case 162 relative to the longitudinal axis X. The mounting assemblies 180 can be circumferentially distributed along the annular flange 174 relative to longitudinal axis X, as illustrated by FIG. 5.

Each mounting assembly 180 includes an aperture 182 defined in a thickness of the first end portion 168. The aperture 182 is dimensioned to receive a respective one of the fasteners F. Each aperture 182 defines an aperture axis AA having a major component that extends in a radial direction R (FIG. 7) relative to the longitudinal axis X.

Figure 6:
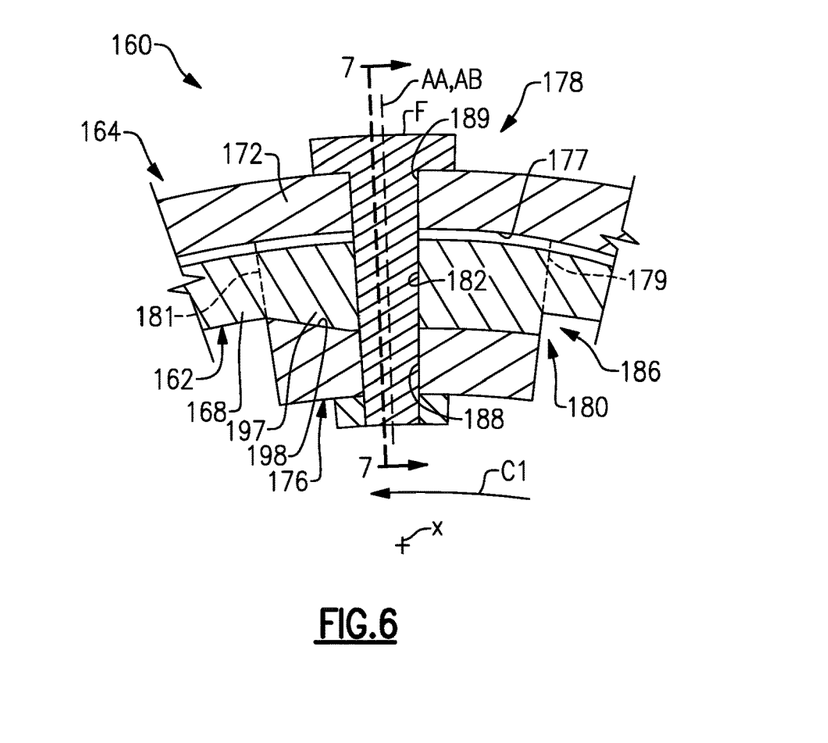
FIG. 6 illustrates a sectional view of one of the twist lock features taken along line 6-6 of FIG. 5.
Figure 7:
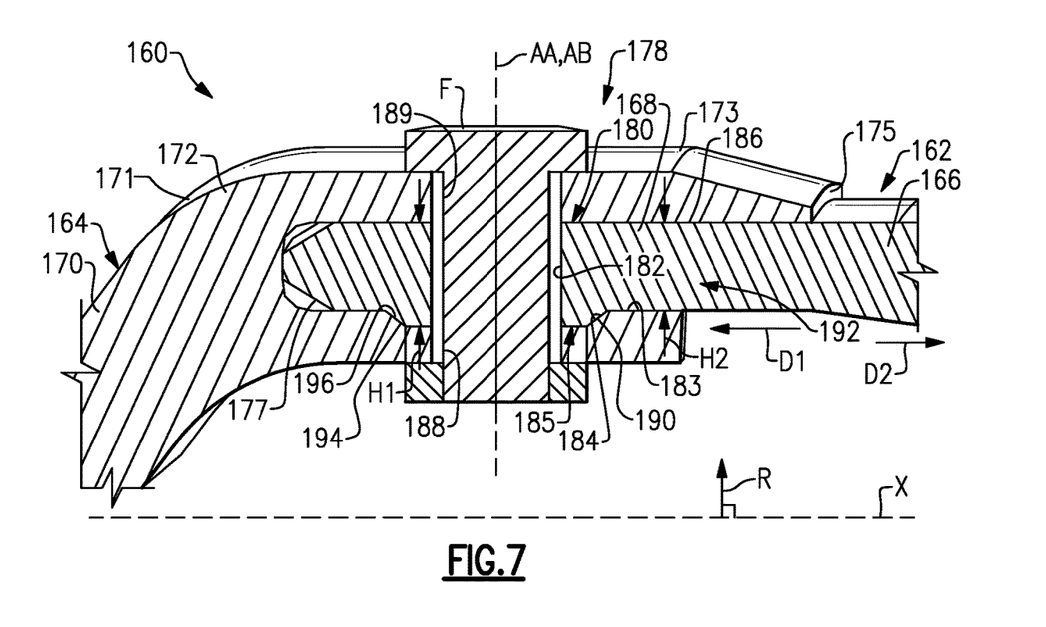
FIG. 7 illustrates a sectional view of the twist lock feature in an assembled position, taken along line 7-7 of FIG. 6.
Figure 8:
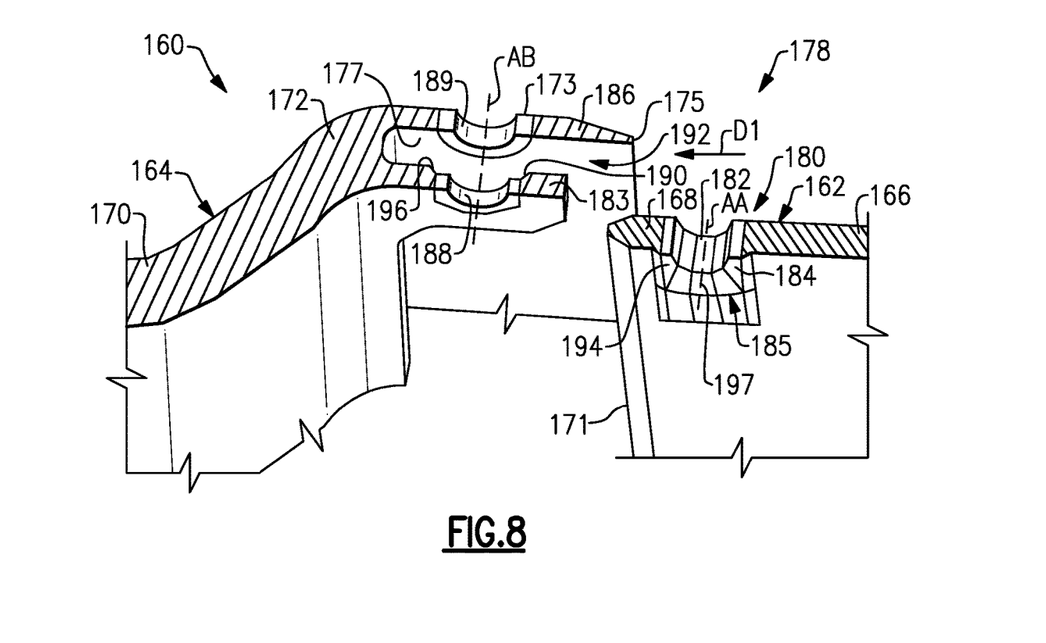
FIG. 8 illustrates an exploded, sectional view of the gas turbine engine components of FIG. 3.
Figure 13:
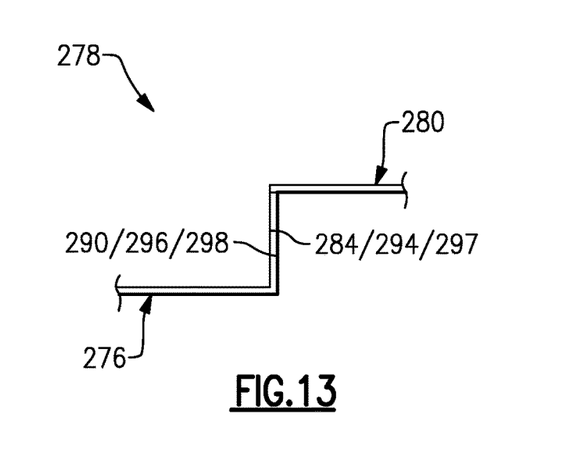
FIG. 13 illustrates a twist-lock feature according to another example.

Each mounting assembly 180 includes a multi-faceted surface contour defined by a raised portion or detent 185 including a first axially ramp surface 184 and another axially ramped surface 194 on an opposed side of the aperture 182 as illustrated in FIGS. 7-8. The mounting assembly 180 can include a circumferentially extending ramped surface 197 between the ramped surfaces 184, 194 as illustrated by FIG. 6. The ramped surfaces 184, 194 can extend axially from a rim of the aperture 182 and ramped surface 197 can extend circumferentially from the rim of the aperture 182 with respect to the longitudinal axis X. The ramped surfaces 184, 194 slope from the aperture 182 and can be contoured to taper into adjacent surfaces of the first end portion 168. In other examples, the surfaces 184, 194 and/or 197 are substantially perpendicular to adjacent surfaces to define respective steps as illustrated by twist-lock feature 278 of FIG. 13.

Each of the flanges 176 of the second case 164 cooperate with the annular flange 173 to define the receptacles 186. Each receptacle 186 is dimensioned to receive a thickness of the first end portion 168 when in an installed position. In the illustrated example of FIGS. 3-4, annular flange 173 extends along the second end portion 172 to form a continuous hoop. In other examples, flange 173 includes discrete segments that pair with respective flanges 176.

The flange 173 opposes the flanges 176 to define respective channels 177 of the receptacles 186, with a cross-section of the second end portion 172 along each of the flanges 176 having a generally U-shaped geometry as illustrated in FIGS. 7-8. Each channel 177 extends circumferentially between opposed circumferential openings 179, 181 (shown in dashed lines in FIG. 6). Each channel 177 extends inwardly from an axial opening 192 defined between the flange 173 and a raised lip 183 of flange 176 (FIGS. 7-8). The openings 179, 181 extend from the axial opening 912 to define a generally U-shaped opening to the channel 177.

The channel 177 is dimensioned relative to the first end portion 168, with each opening 179, 181, 192 is dimensioned to receive the first end portion 168 when in an installed position. In the illustrated example of FIG. 7, the aperture 182 defines a first height H1, and the axial opening 192 defines a second height H2 relative to the longitudinal axis X. The first height H1 is greater than the second height H2 such that the mounting assembly 180 cannot be inserted through the axial openings 192.

The annular flange 173 and each of the flanges 176 define respective pairs of apertures 188, 189 that are substantially axially and circumferentially aligned along an aperture axis AB. In the illustrated example of FIG. 7, the aperture axis AA and aperture axis AB are coaxial and each have a major component that extends in the radial direction R with respect to longitudinal axis X when in an installed position. In other examples, aperture 189 is a blind hole enclosed at a position outward from the receptacle 186, with fastener F threadably received in aperture 189.

Each of the flanges 176 includes a multi-faceted surface contour that is dimensioned to mate and interface with the multi-faceted surface contour of a respective one of the mounting assemblies 180. Each of the flanges 176 includes a second axially ramped surface 190 (FIG. 7), another axially ramp surface 196 that is opposed to the second ramped surface 190 (FIG. 7), and a circumferentially extending ramped surface 198 between the ramped surfaces 190, 196 (FIG. 6). The ramped surfaces 190, 196 can extend axially from a rim of the aperture 188, and ramped surface 198 can extend circumferentially from the rim of the aperture 188 with respect to the longitudinal axis X. The ramped surfaces 190, 196, 198 slope from the aperture 188 and define a portion of a respective one of the channels 177. In other examples, the surfaces 190, 196 and 198 are substantially perpendicular to adjacent surfaces to define respective steps as illustrated by twist-lock feature 278 of FIG. 13.

Adjacent pairs of the axially ramped surfaces 194, 196 are dimensioned to establish an interface that limits relative axial movement of the cases 162, 164 in a first axial direction D1 (FIG. 7) relative to the longitudinal axis X when the ramped surfaces 194, 196 are brought into abutment. Adjacent pairs of the ramped surfaces 184, 190 are dimensioned to establish an interface to interlock the first end portion 168 in the receptacle 186 to limit relative axial movement of the cases 162, 164 and/or limit movement relative to the longitudinal axis X in a second, different axial direction D2 (FIG. 7) when the ramped surfaces 184, 190 are brought into abutment. The ramped surfaces 194, 196 limit insertion of the first end portion 168 into the receptacle 186, whereas the ramped surfaces 184, 190 wedge the mounting assembly 180 in the receptacle 186 and oppose axial withdrawal of the first end portion 168 from the receptacle 186.

In the illustrated example of FIGS. 7-8, the first ramp surface 184 is a declined ramped surface that extends away from a rim of the aperture 182, and the second ramp surface 190 is an inclined ramped surface that extends toward a rim of the aperture 188. Each of the inclined and declined ramp surfaces 184, 190 have a major component that extends in the axial direction with respect to the longitudinal axis X. The second ramp surface 190 is inclined to establish a shoulder to trap the mounting assembly 180 in the channel 177. The first case 162 is rotatable about the longitudinal axis X to define the interface between the ramped surfaces 184, 190 to interlock the first end portion 168 in the receptacle 186 and limit movement of the first and/or second cases 162, 164 relative to the longitudinal axis X.

As illustrated by FIG. 6, each mounting assembly 180 can define a circumferentially ramped surface 197 that cooperates with a circumferentially ramped surface 198 of respective one of the flanges 176. Each of the circumferentially ramp surfaces 197, 198 have a major component in the circumferential direction relative to the longitudinal axis X such that each of the ramp surface 197, 198 slope from the respective apertures 182, 188. Adjacent pairs of the ramped surfaces 197, 198 are dimensioned to establish an interface that limits relative rotation or movement of the cases 162, 164 and mounting assembly 180 in a circumferential direction C1 through the circumferential openings 179, 181 and through the channel 177 (FIGS. 5-6) when the ramped surfaces 197, 198 are brought into abutment. Direction C1 can be clockwise or counterclockwise relative to the longitudinal axis X. The ramped surfaces 184, 190, 194, 196, 197, 198 can be dimensioned to wedge or establish an interference fit between the mounting assembly 180 and the receptacle 186 when in an assembled position, and can be machined or cast into the respective cases 162, 164, for example.

Figure 9:
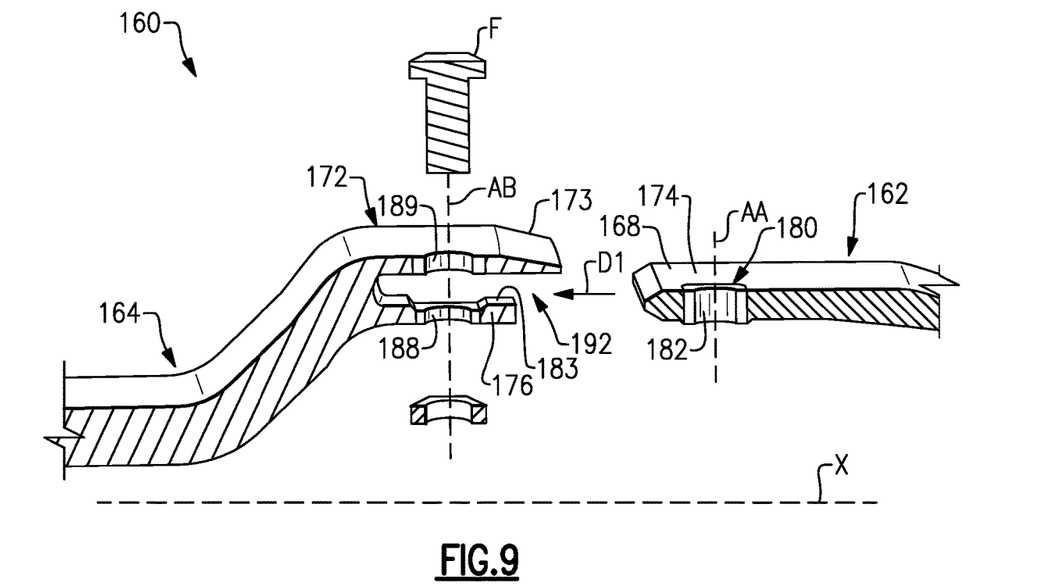
FIG. 9 illustrates another exploded, sectional view of the components and a fastener of the assembly of FIG. 3.
Figure 10:
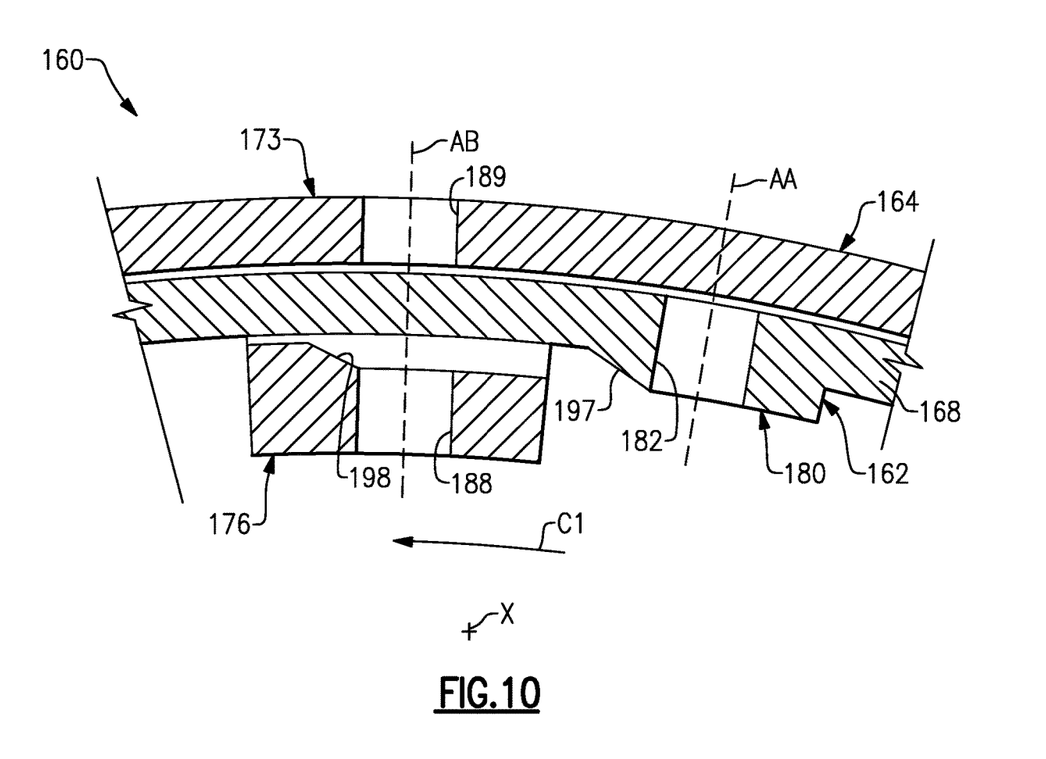
FIG. 10 illustrates a sectional view of the twist lock feature of FIG. 7 in a partially assembled position.

The cases 162, 164 can be assembled as follows. The first case 162 is moved in direction D1 from a first position (FIG. 9) relative to the longitudinal axis X toward the second case 164 and then through each axial opening 192 such that the first end portion 168 is inserted into or otherwise received in each receptacle 186. The mounting assembly 180 is moved axially past the raised lip 183 of the flange 176 to a second position, in which the aperture 182 is substantially axially aligned with apertures 188, 189 (see FIG. 7 with fastener F removed). In the second position, the mounting assembly 180 is circumferentially offset from the adjacent flange 176 as illustrated by FIG. 10. From the second position, the first case 162 is twisted or rotated in the circumferential direction C1 about the longitudinal axis X until the circumferentially extending ramped surfaces 197, 198 are brought into abutment in a third position to interlock each of the mounting assemblies 180 and flanges 176, as illustrated by FIG. 6.

In the installed position, the first and second ramp surfaces 184, 190 are brought into abutment along the respective interface, such that the end portions 168, 172 of the cases 162, 164 interlock with each other. Thereafter, each fastener F can be moved into the apertures 182, 188, 189 and pre-loaded to mechanically attach the cases 162, 164.

Figure 11:
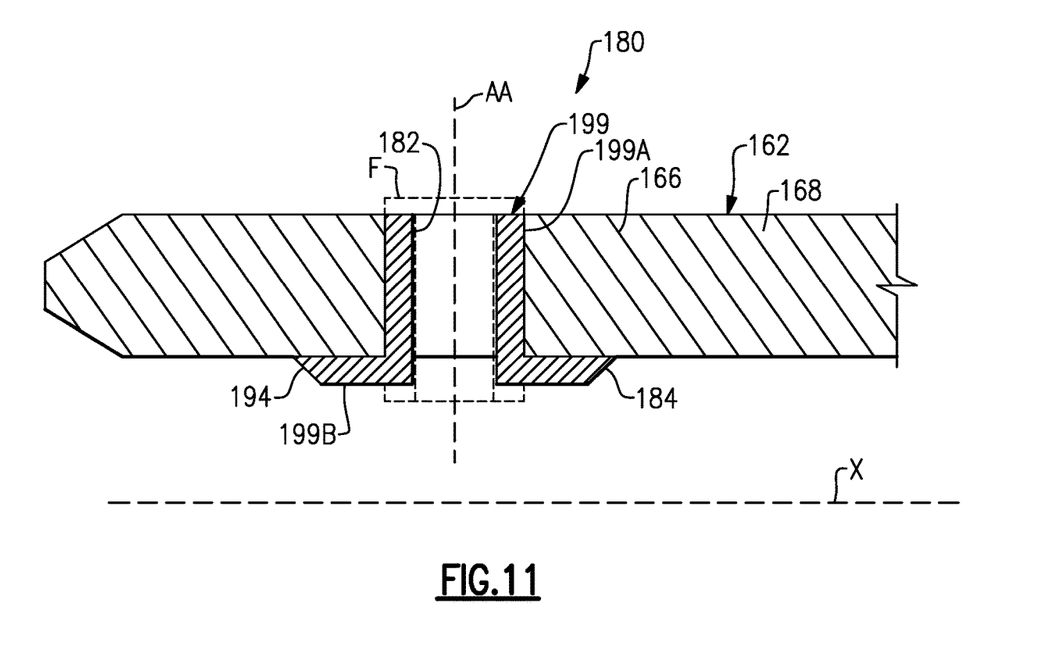
FIG. 11 illustrates a sectional view of an insert in an installed position.
Figure 12:
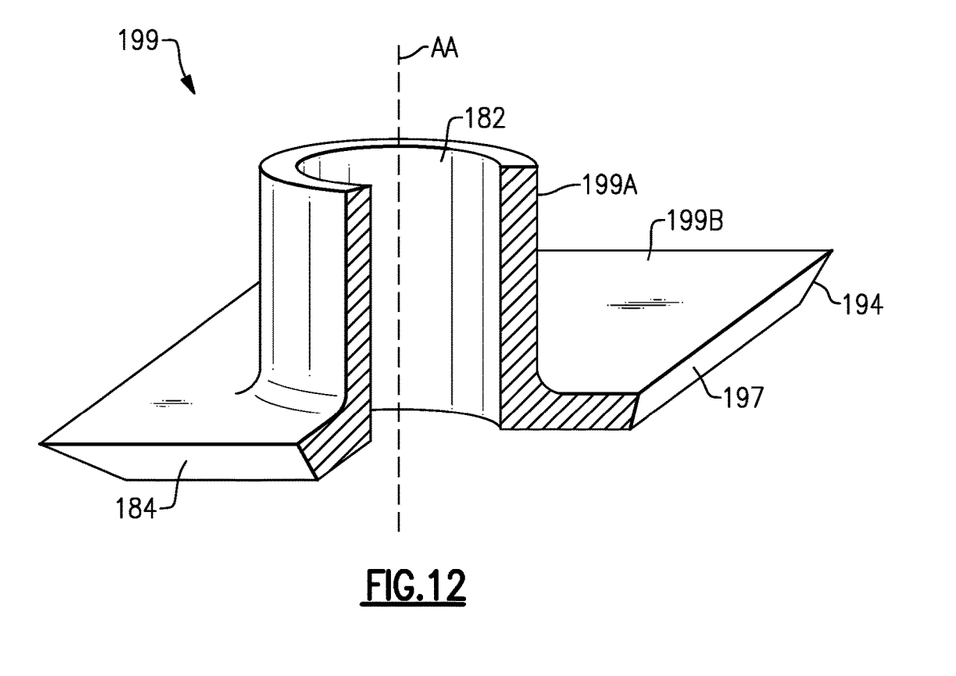
FIG. 12 illustrates an isolated perspective view of the insert of FIG. 11.

Referring to FIGS. 11-12, each mounting assembly 180 can include a fitting or insert 199 that is received in a thickness of the first end portion 168. Each insert 199 includes an elongated body 199A that extends from a base 199B. The aperture 182 is defined in the insert 199 between the body 199A and base 199B. The base 199B can have a generally rectangular geometry and defines each of the ramp surfaces 184, 194, 197.

As illustrated by FIG. 11, the insert 199 is at least partially received in the first body 166 of the first case 162. In some examples, the first body 166 is made of a first material, and the insert 199 is made of a second material. The first and second materials can be the same or can differ. For example, the first body 166 can be made of a composite, such as ceramic matrix composite (CMC), and the insert 199 can be made of a metallic material, such as aluminum or steel. The insert 199 serves as a bushing to receive a respective fastener F (shown in dash lines for illustrated purposes). The insert 199 can be secured in the first body 166 utilizing various techniques, such as bonding with an adhesive.

The assembly 160 disclosed herein, including the twist-lock features 178, can increase resistance to local shear waves and stresses on flanges 173, 174 and 176 that may be caused by impacts due to foreign object debris (FOD) on the cases 162, 164 during engine operation, including inlet cases such as inlet case 114A (FIG. 2). The twist-lock features 178 can also reduce a likelihood of fasteners F shearing due to the impacts. The ramped surfaces disclosed herein, including ramped surfaces 184, 190, can wedge and generate additional friction between the components of the assembly 160 to oppose withdrawal of the mounting assembly 180. The twist-lock features 178 can reduce a material, weight and manufacturing cost of the flanges 173, 174 and 176.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
   a first annular case including a first body extending from a first end portion;
   a second annular case including a second body extending along a longitudinal axis from a second end portion;
   wherein the first end portion includes a first flange, the first flange including at least one mounting assembly, the at least one mounting assembly including a first aperture dimensioned to receive a fastener and a first ramped surface that extends axially from the first aperture;
   wherein the second end portion includes at least one flange defining a receptacle dimensioned to receive the first end portion, a second aperture dimensioned to receive the fastener and a second ramped surface; and
   wherein the first annular case is moveable in an axial direction relative to the longitudinal axis through an axial opening of the receptacle such that the first end portion is received in the receptacle, and is rotatable about the longitudinal axis to define an interface between the first and second ramped surfaces to interlock the first end portion in the receptacle and limit movement of the first annular case relative to the longitudinal axis.

2. The assembly as recited in claim 1, wherein the first and second annular cases extend about the longitudinal axis to bound a gas path.

3. The assembly as recited in claim 1, wherein the first aperture defines an aperture axis having a major component that extends in a radial direction with respect the longitudinal axis.

4. The assembly as recited in claim 1, wherein the first ramped surface is a declined ramped surface that extends away from a first rim of the first aperture, the second ramped surface is an inclined ramped surface that extends toward a second rim of the second aperture, and the inclined and declined ramp surfaces each have a major component that extends in the axial direction.

5. The assembly as recited in claim 1, wherein the second end portion includes an annular flange that opposes the at least one flange to define a channel of the receptacle, the channel is dimensioned to receive the first end portion, and the second ramped surface defines a portion of the channel.

6. The assembly as recited in claim 1, wherein the first aperture defines a first height, the channel extends inwardly from the axial opening, the axial opening defines a second height, and the first height is greater than the second height.

7. The assembly as recited in claim 1, wherein the at least one mounting assembly includes an insert at least partially received in the first body, the insert defining the first aperture and the first ramped surface.

8. The assembly as recited in claim 7, wherein the first body is made of a first material, and the insert is made of a second, different material.

9. The assembly as recited in claim 1, wherein the at least one flange is a plurality of flanges circumferentially distributed along the second end portion relative to the longitudinal axis, the first flange is an annular flange, and the at least one mounting assembly includes a plurality of mounting assemblies circumferentially distributed along the annular flange that interlock with a respective one of the plurality of flanges to limit movement of the first annular case relative to the longitudinal axis.

10. The assembly as recited in claim 9, wherein the at least one mounting assembly defines a circumferentially extending ramped surface that interfaces with a circumferentially extending ramped surface of the at least one flange to limit circumferential movement of the at least one mounting assembly relative to the longitudinal axis.

11. A gas turbine engine comprising:
a first engine case including a first body extending along an engine longitudinal axis from a first end portion to bound a gas path;
a second engine case including a second body extending along the engine longitudinal axis from a second end portion to bound the gas path; a plurality of fasteners;
wherein the first end portion includes a first flange having a plurality of mounting assemblies circumferentially distributed about the engine longitudinal axis, each of the mounting assemblies including a first aperture dimensioned to receive a respective one of the fasteners and a declined ramped surface that extends away from a first rim of the first aperture;
wherein the second end portion includes a plurality of flanges circumferentially distributed about the engine longitudinal axis, each of the plurality of flanges defining a receptacle dimensioned to receive the first end portion, a second aperture dimensioned to receive a respective one of the fasteners and an inclined ramped surface that extends toward a second rim of the second aperture; and
wherein the first engine case is moveable in an axial direction into each receptacle and is then rotatable in a circumferential direction about the engine longitudinal axis to interlock each of the plurality of mounting assemblies and a respective one of the plurality of flanges.

12. The gas turbine engine as recited in claim 11, wherein one of the first and second engine cases is an inlet case that defines an inlet of the gas turbine engine, and the inlet case is cantilevered from another one of the first and second engine cases when in an installed position.

13. The gas turbine engine as recited in claim 11, wherein each of the mounting assemblies includes an insert at least partially received in the first body, the insert defining the first aperture and the declined ramped surface.

14. The gas turbine engine as recited in claim 13, wherein the first body is made of a composite material, and the insert is made of a metallic material.

15. The gas turbine engine as recited in claim 11, wherein the first aperture defines an aperture axis having a major component that extends in a radial direction with respect the engine longitudinal axis.

16. A method of assembly for a gas turbine engine comprising:
a first annular case including a first body extending from a first end portion;
a second annular case including a second body extending along a longitudinal axis from a second end portion;
wherein the first end portion includes a first flange, the first flange including at least one mounting assembly, the at least one mounting assembly including a first aperture dimensioned to receive a fastener and a first ramped surface that extends axially from the first aperture;
wherein the second end portion includes at least one flange defining a receptacle dimensioned to receive the first end portion, a second aperture dimensioned to receive the fastener and a second ramped surface; and
wherein the first annular case is moveable in an axial direction relative to the longitudinal axis through an axial opening of the receptacle such that the first end portion is received in the receptacle, and is rotatable about the longitudinal axis to define an interface between the first and second ramped surfaces to interlock the first end portion in the receptacle and limit movement of the first annular case relative to the longitudinal axis;
wherein the method comprises:
moving the first flange along the longitudinal axis into the receptacle of the second flange;
rotating the first annular case about the longitudinal axis such that the first ramped surface of the first flange abuts the second ramped surface of the receptacle to interlock the first and second annular cases; and
mechanically attaching the first and second flanges with the fastener received in the first and second apertures of the first and second flanges, and wherein the first and second ramped surfaces slope from the respective apertures.

17. The method as recited in claim 16, wherein the second annular case includes an annular flange that opposes the second flange to define a channel of the receptacle, the channel is dimensioned to receive the first flange, the second ramped surface defines a portion of the channel, and the step of mechanically attaching the first and second flanges includes pre-loading the fastener to compress the annular flange and the second flange against the first flange such that a height of the channel is reduced in a radial direction with respect to the longitudinal axis.

18. The method as recited in claim 16, wherein each of the respective apertures defines an aperture axis having a major component that extends in a radial direction with respect the longitudinal axis.

19. The method as recited in claim 16, further comprising securing an insert in a thickness of the first flange, the insert defining the first ramped surface and a respective one of the apertures.

* * * * *